United States Patent [19]
Nessett et al.

[11] Patent Number: 5,727,145
[45] Date of Patent: Mar. 10, 1998

[54] MECHANISM FOR LOCATING OBJECTS IN A SECURE FASHION

[75] Inventors: Dan M. Nessett, Fremont; Christian J. Callsen, Menlo Park; Ken M. Cavanaugh, III, Montara, all of Calif.

[73] Assignee: Sun Microsystems, Inc., Palo Alto, Calif.

[21] Appl. No.: 670,957

[22] Filed: Jun. 26, 1996

[51] Int. Cl.$^6$ .................................................. G06F 15/00
[52] U.S. Cl. ........................................................... 395/186
[58] Field of Search ................................. 395/186, 561, 395/680, 683, 705; 364/286.4

[56] References Cited

U.S. PATENT DOCUMENTS

| | | | |
|---|---|---|---|
| 4,713,753 | 12/1987 | Boebert et al. | 364/200 |
| 5,291,593 | 3/1994 | Abraham et al. | 395/600 |
| 5,317,746 | 5/1994 | Watanabe | 395/700 |
| 5,457,797 | 10/1995 | Butterworth et al. | 395/650 |
| 5,522,079 | 5/1996 | Acker et al. | 395/700 |
| 5,535,389 | 7/1996 | Elder et al. | 395/700 |
| 5,539,909 | 7/1996 | Tanaka et al. | 395/700 |
| 5,542,045 | 7/1996 | Levine | 395/186 |
| 5,546,584 | 8/1996 | Lundin et al. | 395/700 |
| 5,608,720 | 3/1997 | Biegel et al. | 370/249 |
| 5,613,148 | 3/1997 | Bezviner et al. | 395/800 |
| 5,642,511 | 6/1997 | Chow et al. | 395/701 |

OTHER PUBLICATIONS

Chapin et al., "Security for the Common Object Request Broker Architecture (CORBA)" IEEE Tenth Annual Computer Security Appl. Conf., Dec. 1994, pp. 21–30.
Deng et al., "Integrating Security in Corba Based Object Architectures", IEEE Proceedings 1995 IEEE Symposium on Security and Privacy, May 1995, pp. 50–61.
Orali et al., "Essential Client/Server Survival Guide", Van Nostrand Reinhold, 1994, Chapter 21—Object Request Brokers, pp. 337–366.

Object Management Group, "The Common Object Request Broker: Architecture and Specification", Rev. 2.0, Jul. 1995.

Object Management Group, "Corba Security", Dec. 1995, OMG Doc. No. 95–12–1.

*Primary Examiner*—Robert W. Beausoliel, Jr.
*Assistant Examiner*—Stephen C. Elmore
*Attorney, Agent, or Firm*—Hickman Beyer & Weaver

[57] ABSTRACT

In a distributed object computing system, a client makes a call to a daemon process of a host computer in order to communicate with a target object in an object server process. This call uses a particular security mechanism to ensure a secure communication. The daemon process locates the object server and starts it if necessary. The object server provides the daemon process with a list or table of all the particular security mechanisms that it supports. Using a security class identifier provided by the client in the original call, the daemon process selects a particular security mechanism supported by the server, and then returns this new security mechanism along with the server's port to the client. The client constructs a new object reference to the target object and then calls the target object directly using the new security mechanism. The new security mechanism may be different from the original security mechanism used to communicate with the daemon process. A foreign client from a different distributed system may also attempt to locate or invoke upon a target object using a similar technique for secure communication. In this situation, because the object reference may be unintelligible to the foreign client, the daemon process constructs a new object reference before sending it back to the foreign client. The client and object server may be on the same or different computers. The object reference data structure includes: a host field; a server identifier; a port field; an object key; a security information field; and a security class identifier.

26 Claims, 8 Drawing Sheets

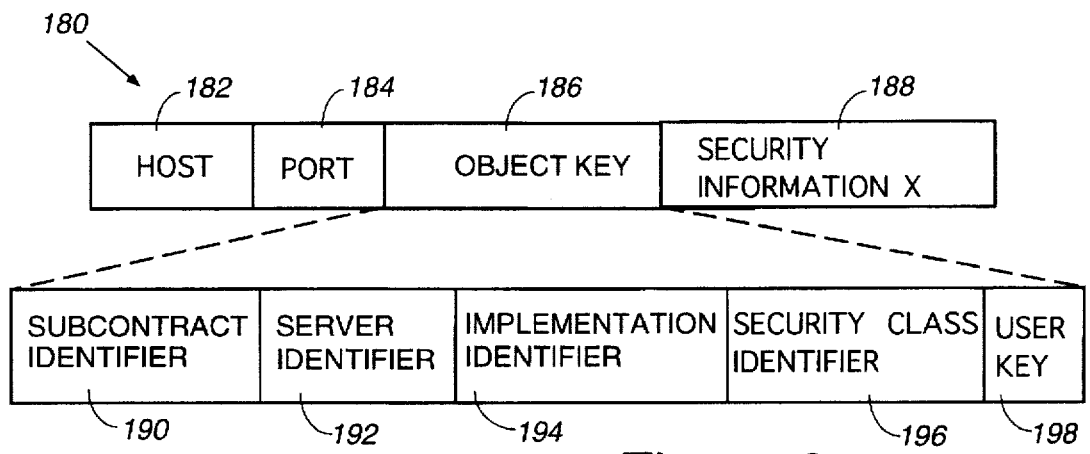
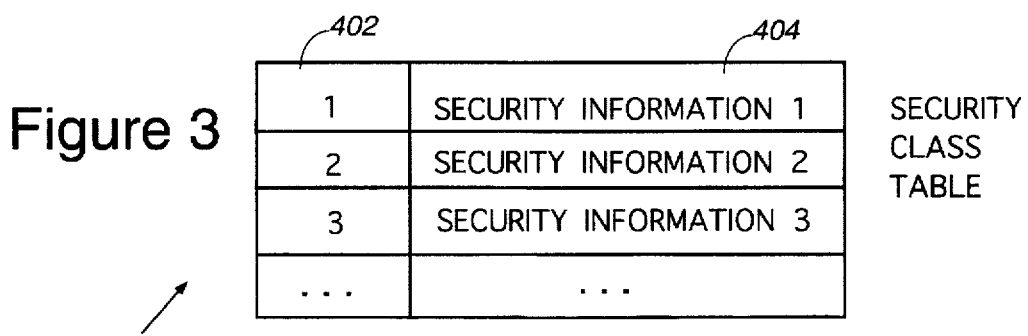
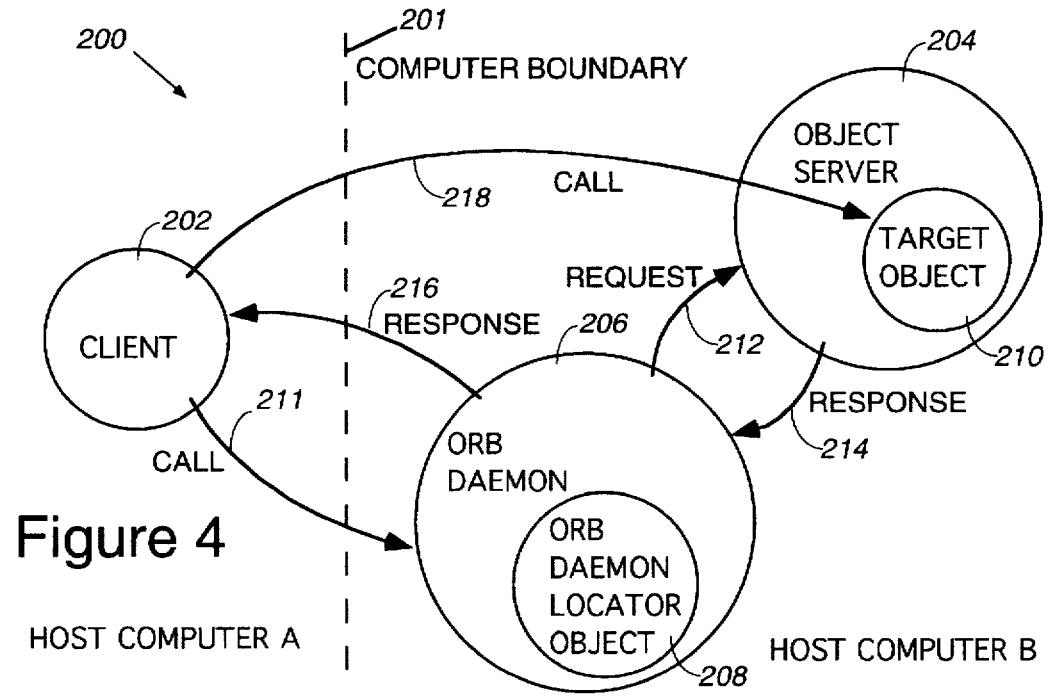

MECHANISM FOR LOCATING OBJECTS IN A SECURE FASHION

FIELD OF THE INVENTION

The present invention relates generally to a distributed object system of a computer network. More specifically, the present invention relates to maintaining security in such a system while locating the server for a particular object.

BACKGROUND OF THE INVENTION

In a distributed object computing system, objects within the system may be located on many different host computers that form a network. In the course of execution of a distributed object application program, these distributed objects on different computers may need to communicate with one another over a network using a communication medium such as telephone lines, microwave relays, cable lines, fiber optic cables, satellite transmission and the like. As in any communication system, security for certain transactions using such media is important. Secure communications are also important for objects within a distributed object computing system. Since sensitive information can be passed among the objects resident in a distributed object system, it is important that any sensitive information be passed among only those objects that are authorized to handle such information and that this information be protected from view by unauthorized users, objects, processes and the like.

Secure communications has different aspects. In one aspect, it is desirable that messages passed between objects be protected, that is, that the messages be encoded in some form to prevent unauthorized viewing if the message is intercepted. This may involve passing back and forth encrypted messages. In another aspect, it is desirable that objects communicating with each other mutually authenticate themselves to demonstrate to each other that the identity of each object is what that object claims that identity to be. For example, in some cases an object may masquerade as an authorized client object, attempting to retrieve information to which the masquerading object should not have access. Conversely, an unauthorized object server or host computer may masquerade as an authorized object server and attempt to provide incorrect information to an unsuspecting client. Secure communications may involve other aspects of security such as passing an encryption key back and forth. For a given transaction, the objects may be communicating in a secure fashion by using a particular security mechanism (or security protocol), such as Kerberos, Simple Public Key Mechanism (SPKM) Sesame, or others.

Generally, in a distributed object computing system, a Location Service is constantly running in the background of a host computer and is used to locate object servers. Object servers installed in the system, in turn, provide individual server objects (or target objects) that may be called by clients executing on the same machine, or another machine. A client may be an object itself, or another process. And although a secure transaction is most applicable when a client is communicating to a remote target object over a network, security can be an issue even when the client and the target object are located on the same host computer, or even within the same process. In the course of locating a target object and performing an invocation upon it, a particular security mechanism may be used to locate the object and to call it. However, the object server may wish to implement or require different security mechanisms at different times and in different situations. In addition, each object server may require a different security mechanism. Furthermore, the Location Service may be using a security mechanism different from that used by an object server. And it may be undesirable for the Location Service to implement all of the different security mechanisms used by the servers that the Location Service supports.

Therefore, it would be desirable to have a technique for locating a particular object of an object server in a secure fashion. Such a technique would allow for object servers that require different security mechanisms and for an object server itself that may use different security mechanisms. Also, the technique would allow the Location Service to use a single security mechanism for its transactions.

SUMMARY OF THE INVENTION

An embodiment of the present invention is suitable for use within a distributed object computing system that includes clients and object servers. An object server is a process that includes objects that may communicate with clients within the distributed object system. A host computer in the system includes an object request broker (OBR) daemon process arranged to assist in the location of object servers on the host computer and an object server arranged to provide target objects. One aspect of the present invention relates to a method of using a client to invoke upon a target object using secure communications. Initially, the client calls the ORB daemon process (of the same or different computer) using a constructed object reference. The constructed object reference includes an object server identifier, original security information and a security class identifier. This call to the ORB daemon process uses a security mechanism that corresponds to the original security information. By using this security mechanism, it may be determined that the client is authorized to communicate with the object server. In another step, the ORB daemon retrieves security information specific to the object server (identified by the object server identifier) that corresponds to the security class identifier. The ORB daemon returns to the client this retrieved object server security information. The client may then modify the constructed object reference with the object server security information in order to create a modified object reference. Next, the client may invoke on the modified object reference using another security mechanism that corresponds to the returned server specific security information. This second security mechanism may be different from the original security mechanism used by the client to communicate with the ORB daemon process.

Another aspect of the invention relates to a method by which a foreign client may locate a target object in a secure fashion. A foreign client may be a client that is operating in a distributed object system that is different than the one in which the host computer, ORB daemon process and target object operate. Initially, the foreign client performs a locate operation on an original object reference indicative of the target object. This original object reference includes an object server identifier, original security information and a security class identifier. This locate operation uses a security mechanism that corresponds to the original security information to confirm that the foreign client is authorized to communicate with the ORB daemon process. Next, the ORB daemon process invokes a look up operation using the object server identifier and the security class identifier in order to locate the appropriate object server. Once located, the ORB daemon retrieves security information specific to the object server that corresponds to the security class identifier. Once retrieved, the ORB daemon replaces the original security information in the original object reference with the server specific security information in order to construct a modified object reference for the target object. Once modified, the ORB daemon returns to the foreign client the modified object reference so that the foreign client is able to invoke upon the target object directly with the modified object reference.

An embodiment of the present invention also relates to an object reference data structure embodied in a computer-readable medium, and to a computer apparatus that includes such an object reference. The object reference allows a client to identify a target object on a host computer and includes the following information: a host field identifying a host computer; a server identifier that identifies an object server of the host computer that includes the target object; a port field identifying a port of the host computer through which the client may communicate with the object server; an object key that uniquely identifies the target object within the object server; a security information field that indicates a particular security mechanism to be used for secure communications between the client and the target object; and a security class identifier that specifies a single security information out of numerous security informations to be used for secure communications.

BRIEF DESCRIPTION OF THE DRAWINGS

The invention, together with further advantages thereof, may best be understood by reference to the following description taken in conjunction with the accompanying drawings in which:

FIG. 1b shows the flow of a request from a client to a servant object within the distributed object system of FIG. 1a.

FIG. 2 is an object reference according to one embodiment of the present invention that may be used in the distributed object system of FIG. 1a.

FIG. 3 is a security class table according to one embodiment of the present invention used for mapping a security class identifier into particular security information.

FIG. 4 illustrates symbolically the communication between a client, an ORB daemon, and an object server according to one embodiment of the present invention.

DETAILED DESCRIPTION OF THE INVENTION

Overview

Figure 1A:
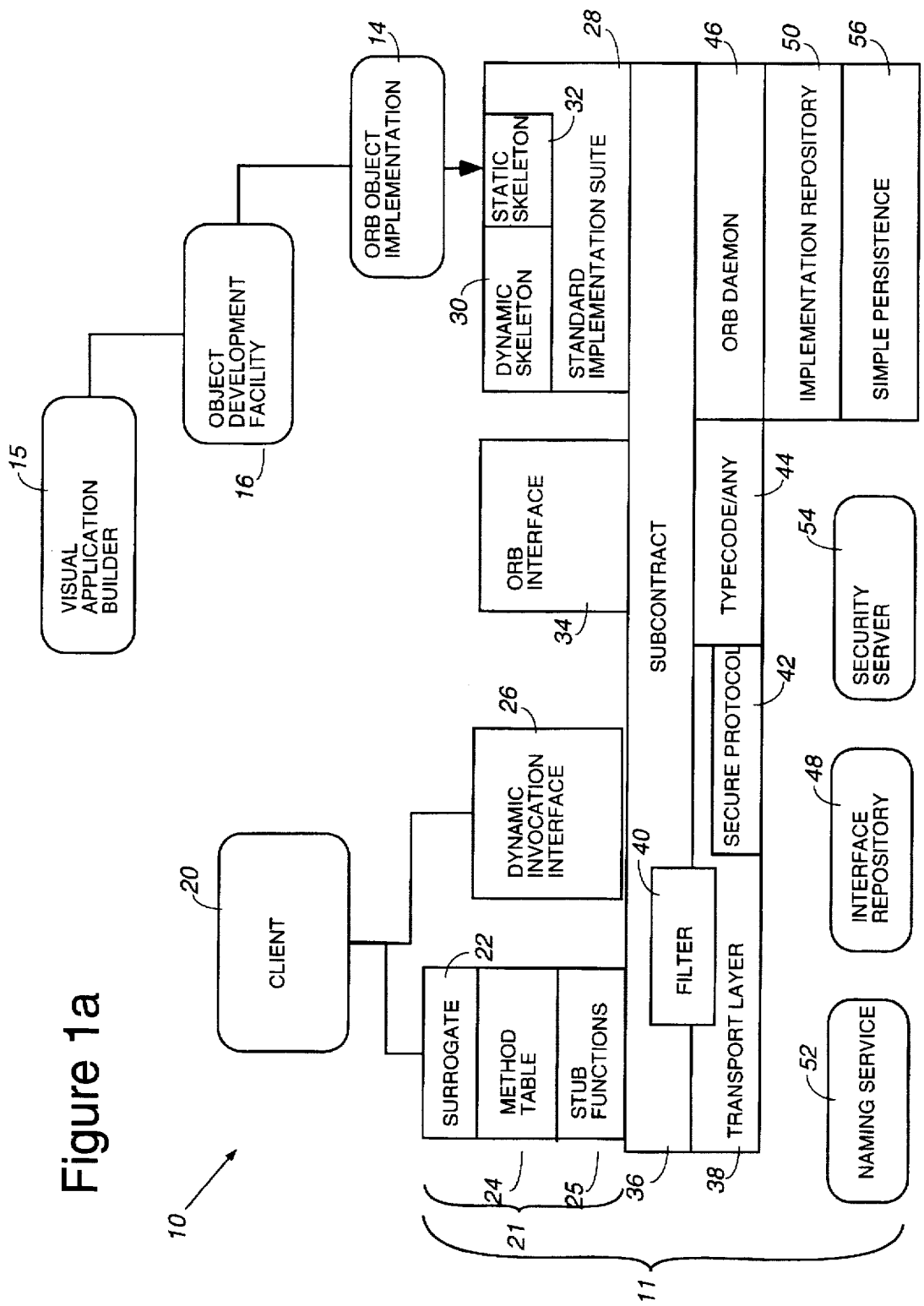
FIG. 1a illustrates a distributed object system having an object request broker (ORB) portion, object development facilities and client and server objects according to one embodiment of the present invention.
Figure 1B:
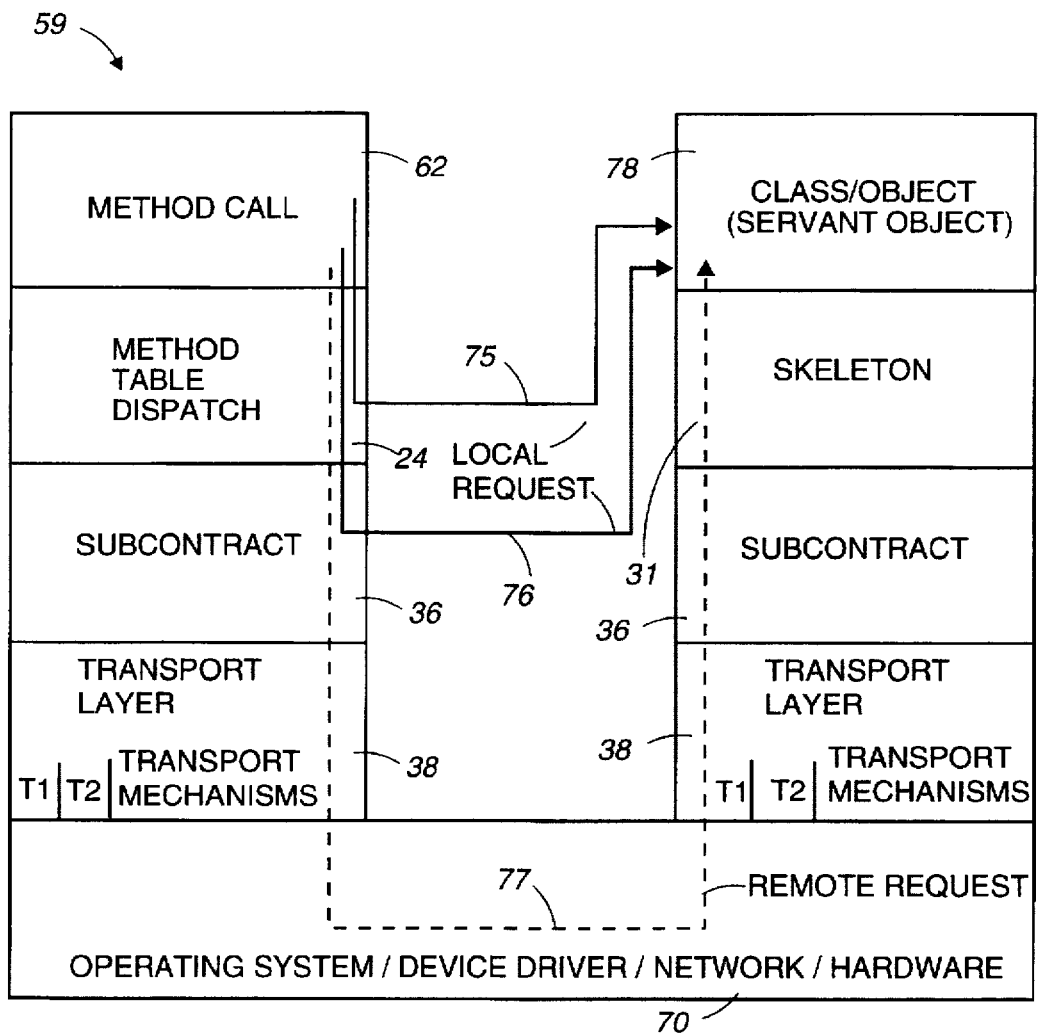
Figure 1C:
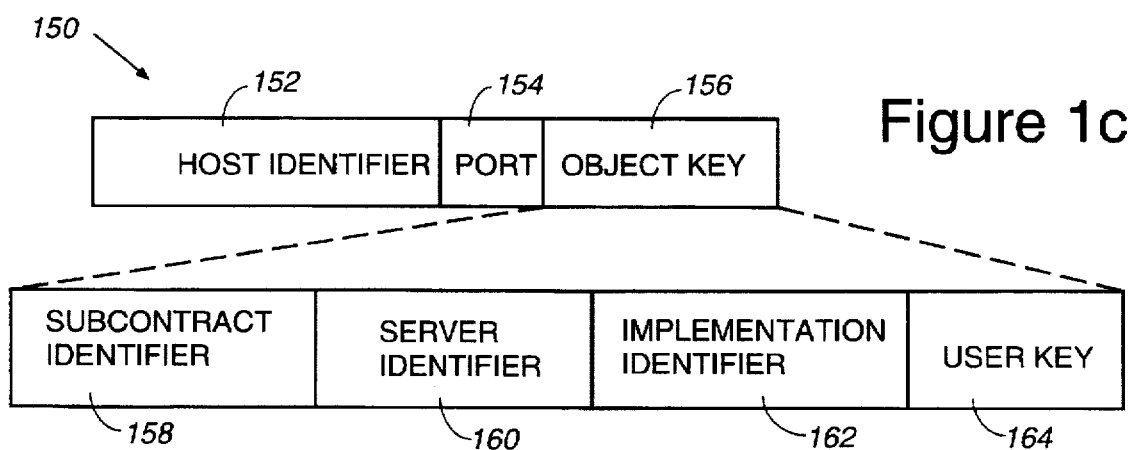
FIG. 1c is an embodiment of an object reference suitable for use within the distributed object system of FIGS. 1a and 1b.

The present invention is directed toward distributed object systems and will be described with reference to several preferred embodiments as illustrated in the accompanying drawings. The invention may be practiced within the context of any suitable distributed object system, including those defined under CORBA or any other suitable specification. However, for purposes of illustration, an embodiment of the present invention will be described primarily within the context of an Object Request Broker (ORB) implemented under the CORBA specification from the Object Management Group (OMG). Revision 2.0, dated July 1995, which is incorporated herein by reference. FIG. 1a diagrammatically illustrates the overall architecture of a representative distributed object system suitable for implementing an embodiment of the present invention. FIG. 1b diagrammatically illustrates some possible flow paths that a request from a client to a servant object may follow within such an architecture that includes a three-level dispatch mechanism. FIG. 1c shows one object reference data structure that may be used by a client to refer to a servant object.

A distributed object system 10 typically includes an Object Request Broker (ORB) 11 as is symbolically illustrated in FIG. 1a. ORB 11 provides all of the location and transport mechanisms and facilities necessary to deliver a call from a client to a servant (target object) and to return a response to the client, as will be discussed below with reference to FIG. 1b. The client and servant may be located in the same process, in different processes on the same machine, or on completely different machines. For the purposes of this discussion, client 20 may be any code that invokes an operation on a distributed object and thus may or may not take the form of a distributed object or a process. A distributed object may have a wide variety of representations. By way of example, the distributed object may be a C++ object that has been provided by an application developer. Alternatively, an implementation for a distributed object may be developed within a visual application builder 15. This visual application builder allows a developer to visually select existing object types from a catalog and graphically connect the services provided by one object to the services needed by another (attributes, arguments, results etc.) in order to create a new implementation for an object.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility 16 in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a subcontract layer 36, possibly a filter 40, and a transport layer 38. Stub 21 includes a surrogate 22, a method table 24 and stub functions 25. Client 20 communicates initially with surrogate 22 that appears to the client as the servant object. Alternatively, client 20 may communicate directly with the servant object through a dynamic invocation interface (DII) 26 instead of through surrogate 22, method table 24 and stub functions 25. Dynamic invocation interface 26 is used to enable clients to construct dynamic requests. One procedure by which a client may make a call to a servant utilizing the above layers is described in more detail below with reference to FIG. 1b.

Subcontract layer 36 provides the functionality required by an object in order to utilize subcontracts to implement various services (or features or object mechanisms) named by a particular subcontract, as described in greater detail in above-referenced U.S. patent application Ser. No. 08/554,794, filed 11/07/95 now U.S. Pat. No. 5,577,251. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in above-referenced U.S. patent application Ser. No. 08/670,682. Filter 40, if being used, may perform a variety of tasks, such as compression, encryption, tracing, or debugging, that are to be applied to communications to and from an object.

Transport layer 38 operates to marshal, unmarshal and physically transport information to and from a servant that typically does not share the same process as a client. Mechanisms for marshaling and unmarshaling inter-object communications are described in above-referenced U.S. patent application Ser. No. 08/673,181. A technique for marshaling/unmarshaling an object reference is above-referenced U.S. patent application Ser. No. 08/670,681.

A standard implementation suite 28 (or object adapter) represents a set of subcontracts that interact with ORB objects 14 in identical ways, as for example object key management. One such implementation suite is described in above-referenced U.S. patent application Ser. No. 08/669,782. It should be noted that a subcontract may belong to multiple implementation suites. Also, implementation suites may utilize different subcontracts. A skeleton, that may take the form of either static skeleton 32 or dynamic skeleton 30, is used to transform requests into a format required by a servant object 78 (as will be explained in more detail below with reference to FIG. 1b). Thus, skeletons 30 and 32 call an appropriate servant object 78. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter.

An ORB daemon 46 is responsible for ensuring that object servers am active when invoked by clients. A technique for starting object servers is disclosed in U.S. patent application Ser. No. 08/408,645 which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between processes on the same machine. The security server 54 is a security administration server that secures the services that are used between processes on different computers.

Typecode/Any module 44 implements "Typecode" and "Any" objects. Typecode describes an Interface Definition Language (IDL) data type, allowing type descriptions to be transmitted between clients and servers. An instance of an IDL data type may be encapsulated by an Any object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. Such a technique is disclosed in U.S. patent application Ser. No. 08/677,013.

A naming service 52 is used to name ORB objects. A client may use naming service 52 to find a desired object by name. Naming service 52 returns an object reference, that in turn may be used to send requests to that object. An Interface Repository 48 (IFR) knows about all interfaces for all objects within the distributed object system.

A request made by a client using a method table ("m-table") dispatch will pass through a variety of the aforementioned layers of the architecture on its way to the servant as diagrammatically illustrated in request flow 59 of FIG. 1b. The request is initiated by a client and may take any suitable form. The form of the request will depend to a large extent upon the nature of the programming language used to create the client. By way of example, if the client is written in the C++ language, the request may take the form of a C++ method call 62. The call is made to a designated object reference taking the form of a surrogate. The surrogate includes methods that comply with the object's interface.

As will be appreciated by those skilled in the art, the object reference used at different locations within a distributed object system may vary significantly in appearance. In the embodiment described, the client side object reference is a dual pointer (referred to herein as a "fat pointer"). A fat pointer contains two distinct pointers. A first pointer points to a client representation ("client rep") associated with the referenced object. A second pointer points to a method table of the method table dispatch 24 that is associated with the referenced object. A client representation is an object that has methods that support invocation as well as CORBA defined "pseudo" object reference operations. These operations include, but are not limited to, a "duplicate" method, a "release" method, a "narrow" method, a "hash" method, and an "is equivalent" method.

After the client has initiated a call, the call is processed using a method table dispatch mechanism 24. Such a technique is disclosed in U.S. patent application Ser. No. 08/307,929 and is hereby incorporated by reference.

The method table dispatch mechanism uses a method table that contains a list of pointers to stub functions 25, one of which is associated with the method to be invoked. Stub functions 25 receive a function or procedure call in the "native" language of the client process, then use either a subcontract layer 36 or a native call to eventually call the corresponding servant object. The native language may be any suitable language, as for example a language such as C++.

Method table dispatch 24 determines the appropriate one of the stub functions 25 to process the method call, and then pairs the method call with the appropriate stub function. In the event that the client making the method call is in the same process as the servant object, a local stub function is called. The local stub function sends the method call directly to servant object 78. A technique for routing calls within a local process is described in above-referenced U.S. patent application Ser. No. 08/670,684.

Alternatively, if the servant object is in a different process, i.e. a remote process, a remote stub function is called. The remote stub function invokes the client representation, that delivers the invocation to servant object 78.

Subcontracts implemented by subcontract layer 36 are logic modules that provide control of the basic mechanisms of object invocation and argument passing that are important in distributed object systems. A subcontract implemented by subcontract layer 36 determines a specific quality of service for use by an object. A subcontract is uniquely identified by a subcontract identifier that is typically embedded in an object reference. A quality of service is a set of service properties. Among possible service properties that are selectable are qualities relating to server activation, security, transactions, filterability, and clean shut-down. Subcontracts are configured such that certain qualities of service are available. With predetermined qualities of service, the overhead associated with processing individual service properties is reduced. Realistically, only "reasonable" or commonly used combinations of service properties are supported with subcontracts. However, subcontracts may be created to meet the specific requirements of a given distributed object system.

The identification of an appropriate subcontract in subcontract layer 36 may be thought of as the identification of a desired function that is unique to that subcontract. For example, a marshal function or an unmarshal function is defined for each subcontract. A subcontract marshal function is used by a stub to marshal an object reference so that it may be transmitted to another address space, or domain. The object reference is typically processed by a transport mechanism in transport layer 38.

A transport mechanism such as T1, T2, etc., that is a part of the transport layer 38 is used to marshal and physically transport information to and from servant objects. Information, i.e. the object reference or the request, is convened into protocols appropriate to a given domain. By way of example, protocols may include, but are not limited to, Ethernet protocols and general inter-ORB protocols (GIOPs). In some uncommon cases, protocols may even entail the use of electronic mail to transmit instructions to be implemented on a server. After information is marshaled, the transport mechanism then transports information through any combination of an operating system, a device driver, or a network, that are all a part of hardware 70 used by the client side of a distributed object system.

While transport mechanisms require a conversion of information into a protocol appropriate to a given domain, some transport mechanisms do not require the encoding of information for different domains. One transport mechanism that does not require a conversion of information into a protocol appropriate to a domain other than the one on which information originates is termed a "door". Doors are essentially gateways between two different processes on the same host. The use of doors eliminates the need for a conversion of information into a canonical implementation in transport layer 38, as there is no need to encode information into a protocol that may be used by a different machine by virtue of the fact that information is remaining on the same host and therefore does not require a change of domain. Hence, information may simply be "flattened out," or marshaled into a stream that is not encoded for use by a different machine, and passed between the two processes on the host.

Once information is transported through hardware 70 used by the client side, the information is then transported to hardware 70 on the server side of a distributed object system. Once information is routed through hardware 70, the server side of a distributed object system invokes a transport mechanism such as T1, T2 etc. to receive information on an end point that is a part of transport layer 38. In the event that an end point is not created by transport layer 38, transport layer 38 provides the functionality needed for the end point to be created by subcontract layer 36. By way of example, a dedicated end point is typically created by subcontract layer 36, while cluster end points, which typically include network and TCP/IP end points, are typically created by transport layer 38. Regardless of whether end points are created by subcontract layer 36 or transport layer 38, end points "live in," i.e. are a part of, transport layer 38. End points are essentially ports that receive information from a different domain. After an end point in transport layer 38 receives information transported from a different domain, the end point then dispatches the information from transport layer 38 to subcontract layer 36. Subcontract layer 36 then dispatches the information to the skeleton and the servant. Such a technique for performing this three-level dispatch is described in above-referenced U.S. patent application Ser. No. 08/670,700.

Subcontract layer 36 provides the functionality to unmarshal at least some of the information it has received. That is, subcontract layer 36 unmarshals at least part of the request. Then, the request is dispatched to a skeleton 31 that transforms the request into an implementation specific format required by servant object 78. The skeleton 31 may either be a static skeleton 32 or a dynamic skeleton 30 as described above.

In general, a remote request is routed through the client side and the server side as described above. The method call 62 is received, method table dispatch layer 24 is used to identify an appropriate subcontract prior to the selection of a transport mechanism in transport layer 38 that marshals the request and prepares it for transport to another domain. Through hardware 70, the marshaled request is transported to the server side where it is received on an end point that is a part of transport layer 38. An appropriate end point receives information transported across a wire, and information is dispatched from transport layer 38 to subcontract layer 36, that provides the functionality to at least partially unmarshal the information it has received. The subcontract layer then dispatches the request to skeleton 31 that transforms the request into a specific format required by servant object 78. This path is shown by arrow 77, and is the path that may be taken by both remote and local requests.

However, if a client and a server are in a local process, i.e. both the client and the server are in the same process, the use of the path shown by arrow 77 as described above is unnecessarily complex. If it is known that the client and the server are in the same process, it is possible to shorten the invocation path, or flow path of a request for service. If a local process may be identified when an object reference is created, shortened flow paths, i.e. the paths represented by arrows 75 and 76, may be taken to send a request from a client to a server that am on the same host. The path represented by arrow 76 is more likely to be taken, as it uses subcontract layer 36 to identify an appropriate subcontract. However, in situations in which an appropriate subcontract does not need to be explicitly identified, the path represented by arrow 75 may be taken.

FIG. 1c will now be used to describe an embodiment of an object reference. As will be familiar to those skilled in the art, object references may take a variety of forms depending upon the location within the process that they are being held at any given time. However, by way of background, a representative object reference for use in a system that utilizes a low overhead implementation suite is illustrated in FIG. 1c. In the implementation shown therein, object reference 150 includes a host identifier 152, a port designation 154, and an object key 156. Object key 156 includes a subcontract identifier 158, a server identifier 160, an implementation identifier 162, and a user key 164. Host identifier 152 denotes a particular computer in a network, while port designation 154 identifies the port of the selected computer that is to be used for communication. Object key 156 provides further identifying information used in order to locate a desired servant object on its host machine.

Server identifier 160 names a particular process or program in which the servant object resides, while user key 164 is a unique number or string used to locate the servant within the process named by server identifier 160. Subcontract identifier 158 is used to attach the protocol of a particular subcontract and its associated services with a servant, and implementation identifier 162 names an implementation of an interface that is to be used with that servant object.

Secure Location of Objects in a Distributed Object System

One aspect of the present invention solves the problem of maintaining security in a distributed object system while locating the server for a particular object. Security requires that the client be able to mutually authenticate itself with the Location Server (or Location Service), which is referred to herein as an ORB daemon in an embodiment of the present invention. By authenticating itself, the ORB daemon implicitly authenticates any servers that it locates for the client. However, the authentication protocol used by the ORB daemon may use a different security mechanism than the object server. One aspect of the present invention extends the location mechanism in order to allow for different security mechanisms. An object server may be located by a Location Service in a wide variety of manners. By way of example, a suitable location mechanism for locating and starting servers is described in U.S. patent application Ser. No. 08/408,645, which is incorporated herein by reference for all purposes.

In one aspect, the present invention provides a method and apparatus in which a client and an ORB daemon are mutually authenticated to avoid thereby security attacks such as caused by an attacker creating a process that masquerades as the ORB daemon. At the same time, the ORB daemon is freed from having to fully participate in all security mechanisms that servers may use and thereby relieved of such overhead. In particular, the ORB daemon is able to choose a single security policy; and any server supported by the ORB daemon may choose any security policy it wishes. An aspect of the present invention also provides secure techniques for use by a client when invoking upon an object reference, when locating an object, and for other communications. A technique suitable for invoking on an object reference in order to communicate with a target object is discussed above with reference to FIG. 1b.

In one embodiment, the present invention provides a method and apparatus that allows an object reference held by the client to be associated with the default security information needed by the ORB daemon so that secure invocation and location operations may be performed by the client. Once the ORB daemon receives a request from the client, the ORB determines the appropriate server specific security information (which may be one of many) that the server requires for a communication and returns this new security information to the client. In one embodiment, a server is configured to process several different security protocols (e.g., Kerberos, SPKM, and Sesame). The server specific security information required by the server for communicating with the client is returned to the client by the ORB. The client then constructs a modified object reference that uses the server specific security information and calls the server directly using the appropriate security mechanism dictated by the new security information. In this fashion, the ORB daemon may use a single security mechanism for use with its communications, while it is still able to return to the client the server specific security information that the server will require. FIGS. 5 through 8 (described below) illustrate various embodiments of the invention in which secure invokes and locates are performed. First, details of embodiments of the present invention are presented in FIGS. 2 and 3, and then an overview is presented in FIG. 4.

Turning now to FIG. 2, an embodiment of an object reference 180 suitable for use with the present invention is illustrated. Although similar to the object reference described above in FIG. 1c, the object reference of FIG. 2 uses additional information that will allow secure communications in accordance with an embodiment of the present invention. The object reference 180 includes a host field 182 that identifies a host computer in a network, a port field 184 that identifies a communication port (such as a TCP/IP port), and an object key field 186 that uniquely identifies an object within a host. The object key field 186 includes a subcontract identifier sub-field 190 that indicates a particular subcontract module of functionality for use in managing the object, a server identifier sub-field 192 that identifies a server of the host, an implementation identifier sub-field 194 that identifies an implementation of the object's interface, and a user key sub-field 198 that uniquely identifies an object within a server. The additional information will now be described.

This additional information includes a security class identifier 196, and security information 188. The security information field 188 describes a particular security mechanism dictating how information will be passed and how objects will mutually authenticate themselves for use with this particular object reference. The security class identifier may be used to select among many different security mechanisms that may be supported by a server and will be explained in more detail below with reference to FIGS. 3 and 4. It should be appreciated that the security information 188 may be represented and implemented in a wide variety of manners. By way of example, this security information may be represented as part of a security information list as described in the CORBA Security Document, OMG Document No. 95-12-1, that is part of the CORBA 2.0 standard that defines an Internet Inter-ORB Protocol (IIOP) and which is incorporated herein by reference.

This security document describes the format of one embodiment of a security information list. This list may be thought of as a sequential listing of any number of security information fields. In other words, the security information field 188 of FIG. 2 may be one of the security information fields that are contained in the security information list. In one embodiment, this list is implemented as a sequence of Tagged Components representing a particular security information field. A Tagged Component includes a Tag and Component Data associated with that Tag. The Tag identifies which security mechanism is to be used for communication. A wide variety of security mechanisms are possible. By way of example, the protocols of Kerberos, SPKM and Sesame may be identified by the Tag. It is also contemplated that a private security mechanism known only to one ORB (or even being proprietary information) may be identified by the Tag. In this way, although the format of the security information may be known, the security mechanism itself may not be. A security mechanism has different roles that it performs in the context of communication. A mechanism may protect individual messages from prying eyes by way of encryption, may mutually authenticate one object to another, and may also perform encryption key distribution. These roles are further defined in the Component Data that is associated with each Tag.

The Component Data defines for each security mechanism (identified by the corresponding Tag) the services that the mechanism allows a target object to require or allows a target object to support. By way of example, for the Kerberos security mechanism, the Component Data may indicate various options that are required or supported, such as integrity, confidentiality or establish trust. In other words, if the target object requires that confidentiality be used, this means that communications from a client must be in a confidential form. However, if the target merely supports (but does not require) confidentiality, communications from a client may be in a confidential form but it is not necessary for communication to proceed between client and server. Component Data may also include a Security Name that is a secret name used by the server to authenticate itself, and Cryptoprofiles that are the cryptographic algorithms supported by the server. Depending upon the security mechanism identified by the Tag, the Component Data may include other information needed to implement that security mechanism.

And because it is possible that a given server may use different security mechanisms at different times, or with different target objects, an aspect of the present invention provides a technique by which a server may specify which security information (and hence which security mechanism) should be used in communication with a particular object. In one embodiment, this specification technique involves the use of the security class identifier 196 of the object reference. Security class identifier 196 may be implemented in a wide variety of manners. By way of example, it may be represented as an integer. This security class identifier identifies particular security information that should be used when communicating with a particular server. For a given server that supports a security information list containing many different security information fields, there are a wide variety of ways that the security class identifier may be mapped to a particular security information field. By way of example, each server may have associated with it a security class table such as illustrated in FIG. 3 that allows a security class identifier to be mapped to one of the security information fields of the security information list. For example, if a server's security information list (represented as a sequence of tagged components) has five entries, and the security class identifier has a value of three, this means that the third entry in the security information list is the security information to be used.

FIG. 3 illustrates the relationship between the security class identifier 196 and a security information field 188 according to one embodiment of the present invention. In this embodiment, the security class identifier is mapped to an entry in the security information list by means of a security class table 400. FIG. 3 shows a security class table 400 that includes a column 402 of security class identifiers and a column 404 that has corresponding security information fields. Thus, it can be seen that this table may be used to associate a particular security class identifier with a particular security mechanism as represented by a corresponding security information field. For example, if a server supports a number of security mechanisms by way of a security information list, this list may be embodied as in table 400. It should be appreciated that the relationship as shown in FIG. 3 may be represented in a wide variety of data structures and not necessarily in the table as shown. The particular use of the security class identifier and its corresponding security information field will be explained in more detail below with reference to FIGS. 6, 7 and 8.

An overview of the flow of communication within an embodiment of the present invention will now be explained. FIG. 4 illustrates an exemplary simplistic distributed object system 200 having a host computer A and a host computer B as indicated on either sides of dashed line 201. It should be appreciated that the present invention may be practiced in a system of any number of computers, or even within a single computer or process. Shown is a client 202 resident in a process of host computer A. Located on host computer B is an ORB daemon 206 that may be embodied as a background process constantly executing on a machine. Among other functions, the ORB daemon is responsible for locating servers and target objects on the same machine in response to an invocation or lookup from a client. The ORB daemon may include an ORB daemon locator object 208 whose role is to assist in receiving look up calls and locating servers. The locator object also serves as an interface to functions within the ORB daemon.

The locator object typically has a well-known location within the process such that a calling client from another machine may easily obtain an object reference to this locator object. Also resident on host computer B is an object server 204. This object server is typically a computer process in which resides any number of objects, often called server objects or target objects. Associated with each object server 204 is an embodiment of security class table 400 as shown in FIG. 3 that indicates the security mechanisms that the server supports. The general flow of a call according to an embodiment of the present invention will now be described in FIG. 5 with reference to FIG. 4.

Figure 5:
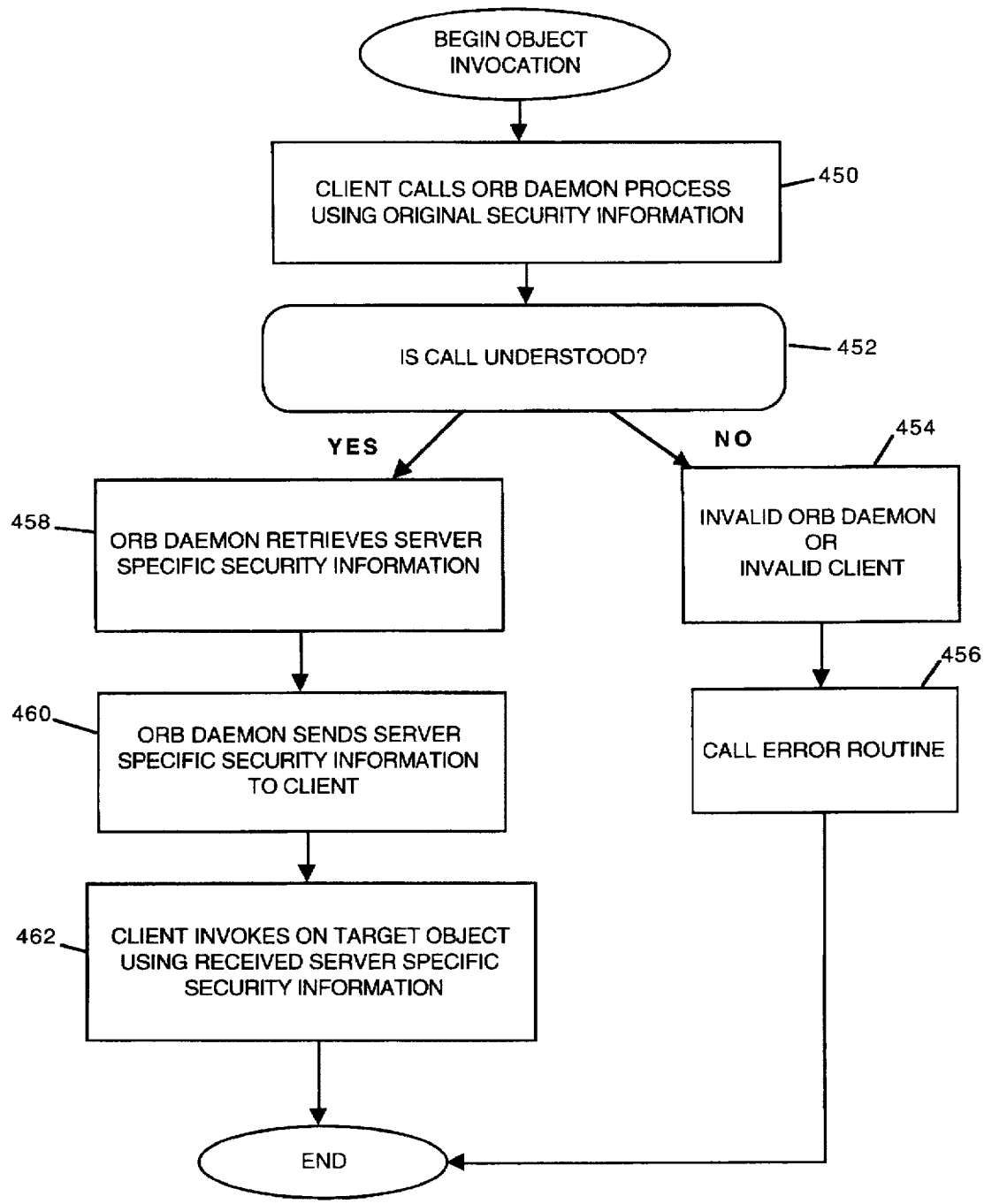
FIG. 5 is a flow chart for an object invocation procedure that locates a server in a secure fashion according to one embodiment of the present invention.

FIG. 5 shows an overview of the process by which a client 202 communicates with an ORB daemon 206 in order to locate a server 204 in a secure fashion according to one embodiment of the present invention. A more detailed description of this process according to other embodiments will be explained below with reference to FIGS. 6, 7 and 8. In one aspect of the present invention, a client 202 may have an object reference that indicates a particular object 210 of server 204, but may not have the correct port to communicate with server 204 nor may have the required security information needed to communicate with server 204. Thus, in a first step 450, the client makes a call to the ORB daemon using original security information contained in its object reference. This original security information represents a security mechanism that the ORB implements, and may be installed in newly created object references by default. The call is typically handled by ORB daemon locator object 208 that is located within the ORB daemon process 206. The communication takes place in a secure fashion as dictated by the original security information in the original object reference held by the client.

If the client cannot implement the required security mechanism or if the ORB daemon cannot understand the call, this may indicate that a fake client or fake ORB daemon is masquerading as the real client or ORB daemon, i.e., an attempt is being made to breach network security. This check is indicated in step 452 by determining if communication is able to take place. Thus, if the client is not a true client, or if the ORB daemon is not the true ORB daemon, then in step 452 control moves to step 454. In this situation, the client may be invalid because the message is indecipherable, or the ORB daemon may be invalid because the client would never receive a response. If so, a standard error routine may be used in step 456 to indicate an invalid client or ORB daemon, and then the procedure ends. However, if the original security information used by the client is the correct information, i.e., the security information and protocol that the ORB daemon is expecting, and the ORB daemon understands the call, then control moves to step 458.

In step 458, the ORB daemon 206 may start up the appropriate server 204 as indicated by arrow 212 and makes a request for the security information that the server requires be used for future communications. Once the server has started, this server responds to the ORB daemon with the security information indicating the security mechanism that the server desires be used with this target object 210. This response is indicated by arrow 214. Next, in step 460, the ORB daemon sends this server specific security information back to the client as indicated by arrow 216. Once the client receives this server specific security information it is now able to make a call 218 to target object 210 using the security information that the server requires for a secure communication with target object 210. In this fashion, original security information may be used to communicate with the ORB daemon, and server specific security information is returned to the client by the ORB daemon for a later call to the server.

Figure 6:
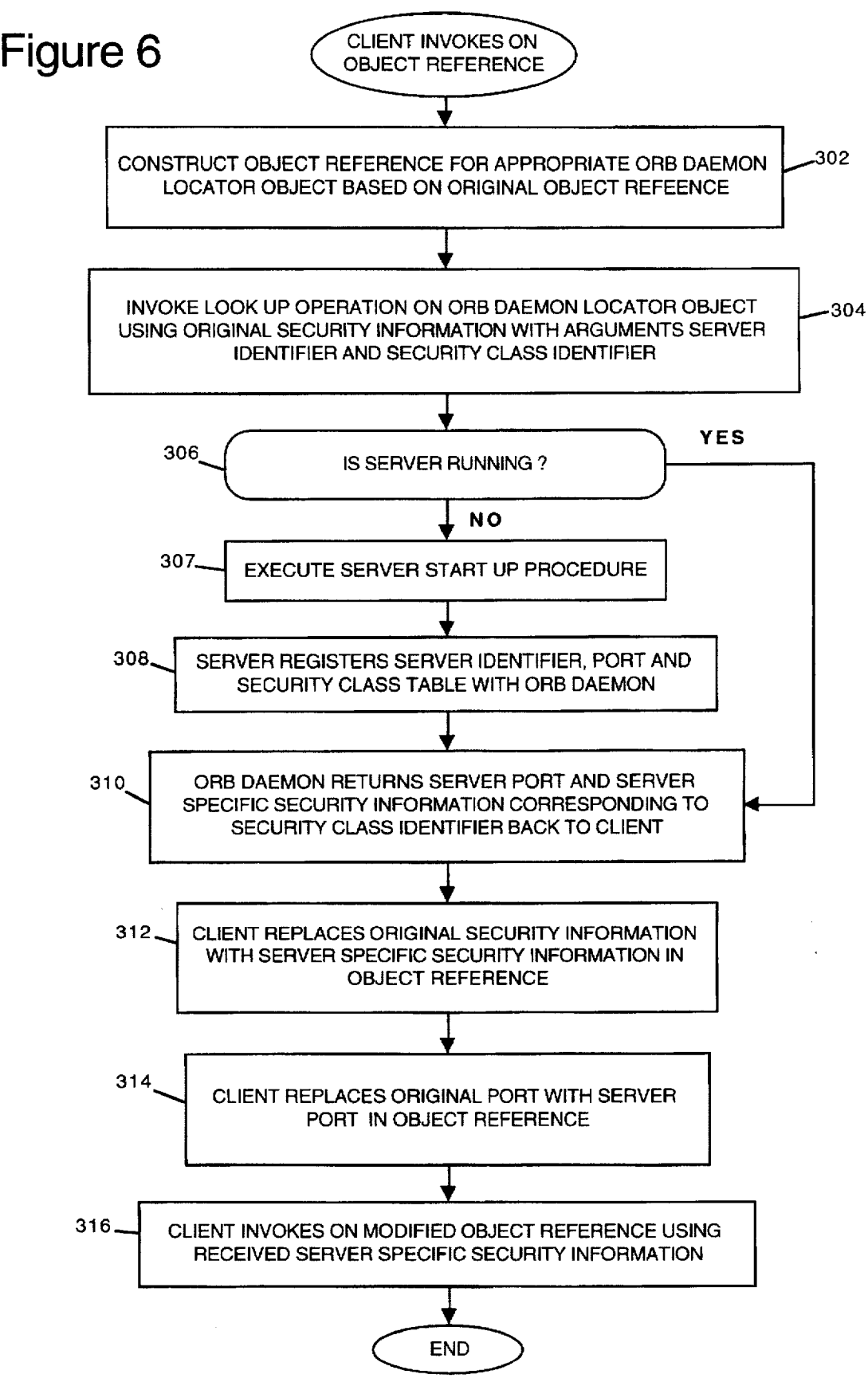
FIG. 6 is a flow chart showing the object invocation procedure of FIG. 5 in greater detail according to one embodiment of the present invention.

FIG. 6 now illustrates an embodiment of the invocation procedure of FIG. 5 in greater detail. In this situation, a client has received an object reference and wishes to invoke upon this object reference in order to communicate with a target object in a remote server. The client may have received the object reference in a previous transaction. However, before the client may make a direct call to the target object, the appropriate security information for the server must be obtained. In this situation, the client may be provided with an object reference that indicates a host 182, an object key 186 that identifies the target object within a server, the server identifier 192 for the server, but may not have the port for communication with the server. The object reference also includes original security information 188 for secure communication with the ORB daemon of the remote machine, and a security class identifier 196 to indicate which security mechanism the server desires for later communication.

In a first step 302 an object reference for the appropriate ORB daemon locator object is constructed based upon the original object reference received by the client. The port of the original object reference is a well-known port for the ORB daemon, and the object key is replaced with the well-known object key for the ORB daemon locator object. The host and security information remain the same. Thus, a call may be made to the ORB daemon locator object in a secure fashion by using the original security information. Next, this constructed object reference is used in step 304 in order to invoke a look up operation defined upon the ORB daemon locator object. Two arguments passed to this look up operation are the server identifier and the security class identifier that are extracted from the original object reference. The goal of this look up operation is to eventually return the server port and the server specific security information back to the client so that client may construct the actual object reference for use in invoking upon the target object within the server.

After step 304, one portion of a secure transaction has been completed. The client has called this ORB daemon locator object using the original security information contained in the client's original object reference. This original security information must match the security mechanism that the ORB daemon itself is expecting. Thus, the ORB daemon is authenticating itself to the client and the client is authenticating to the ORB daemon that it is a real client. Next, the ORB daemon locator object in conjunction with the ORB daemon locates the appropriate server by reference to a registry of executing servers. In step 306, if it is determined that the identified server is already running then control moves directly to step 310. However, if the server is not already running, then the ORB daemon operates to start up this server process in step 307.

Once the ORB daemon has requested that the server start up, the server starts and then registers itself with the ORB daemon by returning to the ORB daemon its server identifier (in order to indicate which server is being registered), its port for communication, and its security class table. The security class table for a particular server has been described above with reference to FIG. 3. This security class table may contain any number of security mechanisms that a server may wish to use by way of identifying any number of security information fields and corresponding security class identifiers as shown in FIG. 3. This table will be used by the ORB daemon in order to deliver appropriate security information back to the client. The ORB daemon registers this server in step 308 by storing the server identifier, port, security class table and other information in a suitable registry. Now the ORB daemon is ready to respond to the client.

In step 310, the ORB daemon returns the appropriate information to the client. This information includes the port for the server and the appropriate security information from the security class table corresponding to the security class identifier that was received from the client initially. Once the client receives this information it is now able to construct an object reference to enable it to communicate in a secure fashion with the target object of the server. In step 312, using the original object reference received by the client, the client replaces the original security information with the received server specific security information from the ORB daemon. Thus, the client will now be able to communicate with the appropriate server using the security information required by that server. In this fashion, the server and client will be able to communicate in a secure fashion and are also able to authenticate that they are communicating with appropriate entities. In step 314, the client also replaces the original port with the received server port in order to communicate with the server. Next, in step 316 the client invokes upon this modified object reference in order to communicate with the target object of the server. Thus, it should be appreciated that through the use of this technique, any security mechanism that the server desires to use may be returned to the client by way of the security information field.

Figure 7:
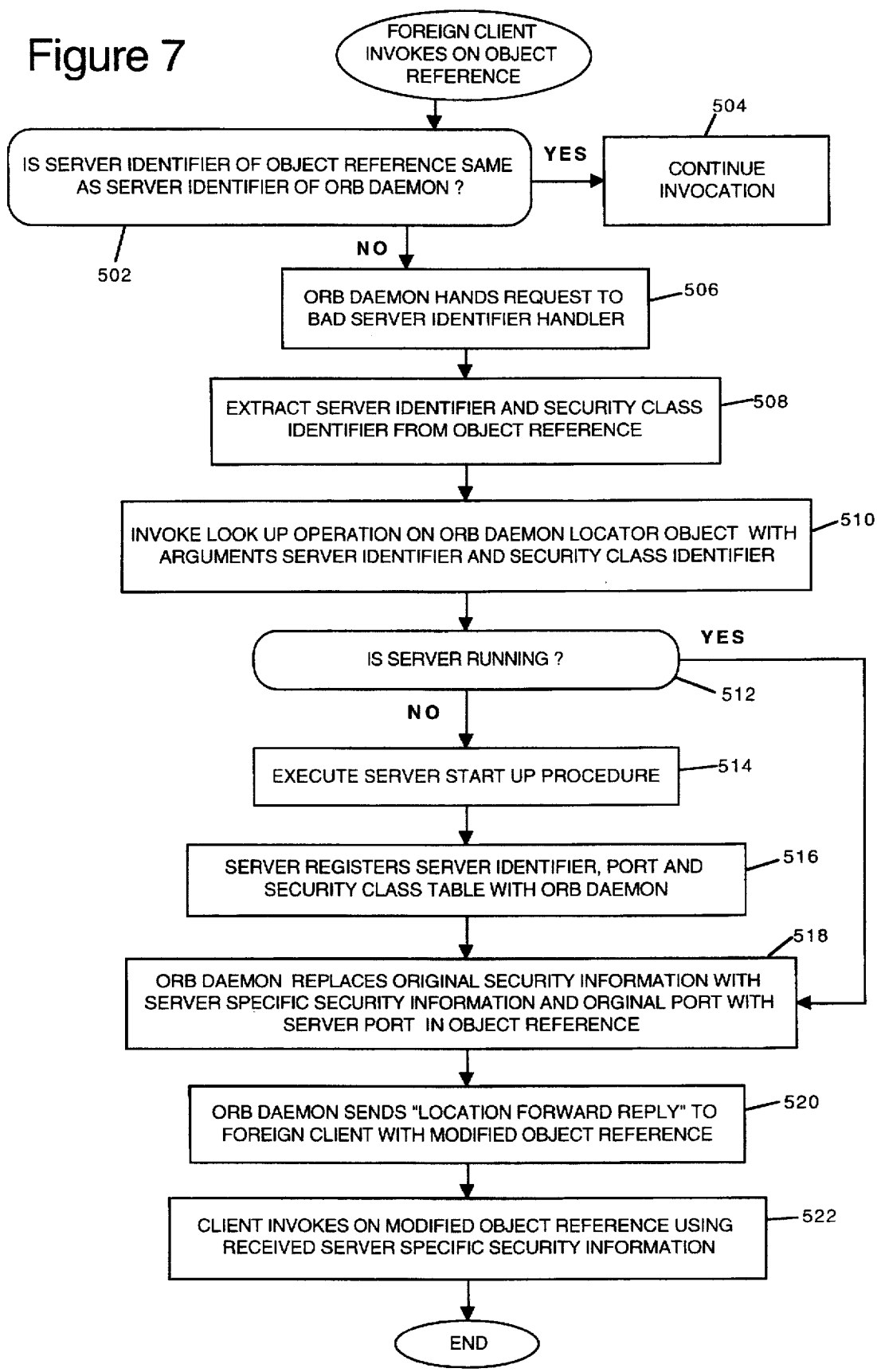
FIG. 7 is a flow chart showing a procedure by which a foreign client may invoke on an object reference for an object located in a different ORB according to one embodiment of the present invention.
Figure 8:
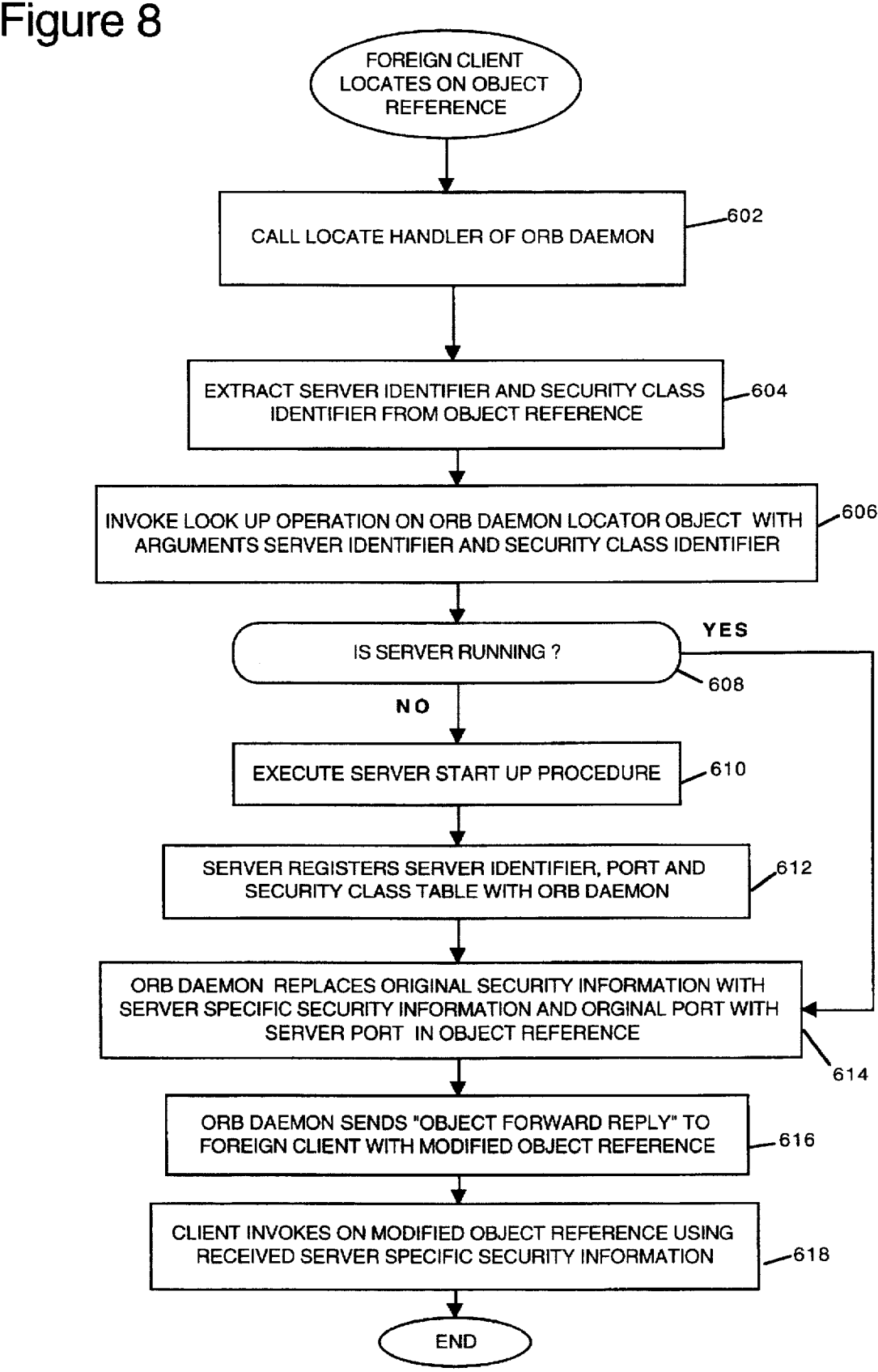
FIG. 8 is a flow chart showing a procedure by which a foreign client may locate an object in a different ORB according to one embodiment of the present invention.

FIGS. 7 and 8 illustrate procedures by which a foreign client may perform an invocation or look up, respectively, upon an object reference in accordance with one embodiment of the present invention. An embodiment of the present invention as described above is also used in this situation in order to perform these procedures in a secure fashion. In this embodiment, a particular "local" ORB is running within a distributed object system. In some manner, an object reference has been created within this ORB and has been passed to a client that is not operating within this same ORB. For example, this client may be operating within a different ORB or within a different distributed object system using a different communication mechanism. In this situation, the client is termed a foreign client, however, the object reference that the foreign client has obtained is an object reference familiar to the local ORB, but not to the foreign client. In this situation, the foreign client will know the host, port and security information but will not be able to decipher the object key, because this object key is particular to the local ORB. Because the object key is opaque to the foreign client, the foreign client may not be able to perform optimizations such as looking at the object key in order to create a local cache of objects. Thus, the foreign client may need to perform a look up procedure first, as described in FIG. 8 below. FIG. 7 below describes the invocation procedure that a foreign client may use first. In both situations, the ORB daemon constructs the object reference for the foreign client because the foreign client is not familiar with the internal representation of the object reference. In this fashion, inter-ORB interoperability is maintained because even though the foreign client may not be able to understand the object reference, it is still able to use it.

FIG. 7 describes a flow by which a foreign client invokes upon an object reference for a target object. In a first step 502 this request is received by the ORB daemon process of the host computer. Because this object reference is particular to this local ORB, this ORB daemon process will be able to decipher the object key. The ORB daemon process first determines if the server identifier of the object reference is the same as the server identifier of the ORB daemon process. Typically, the target object upon which the invocation is being performed will not be within the ORB daemon process, so the server identifiers will not match. However, if they do match, this indicates that the target object is located within the ORB daemon process and in step 504 the invocation is continued normally. The invocation may be continued, for example, as described in the above description of object invocation with reference to FIG. 1b.

If the server identifiers do not match, then the ORB daemon hands off the request to a bad server identifier handler in step 506. This handler is used when the server identifier of the object reference does not match with the current server. For most processes, this handler will return an invalid object message and terminate. However, when called by the ORB daemon process, the handler understands that the servers do not match because a foreign client is making an invocation, and then performs the following steps. In step 508, this handler begins by extracting the server identifier and the security class identifier from the received object reference.

Next, the extracted server identifier and the security class identifier are used as arguments in step 510 in order to invoke a look up operation of the ORB daemon locator object. The goal of this look up operation is to eventually return the server port and the server specific security information back to the ORB daemon so that ORB daemon may construct the actual object reference for use in invoking upon the target object within the server. This actual object reference is then returned to the foreign client as explained below.

Next, the ORB daemon locator object in conjunction with the ORB daemon locates the appropriate server by reference to a registry of executing servers. In step 512, if it is determined that the identified server is already running then control moves directly to step 518. However, if the server is not already running, then the ORB daemon operates to start up this server process in step 514.

Once the ORB daemon has requested that the server start up, the server starts and then registers itself with the ORB daemon by returning to the ORB daemon its server identifier (in order to indicate which server is being registered), its port for communication, and its security class table. The security class table for a particular server has been described above with reference to FIG. 3. This security class table may contain any number of security mechanisms that a server may wish to use by way of identifying any number of security information fields and corresponding security class identifiers as shown in FIG. 3. This table will be used by the ORB daemon in order to deliver appropriate security information back to the client. The ORB daemon registers this server in step 516 by storing the server identifier, port, security class table and other information in a suitable registry.

At this point, the ORB daemon is ready to construct the actual object reference. First, the ORB daemon utilizes the received security class identifier as an index into the security class table in order to retrieve the appropriate security information that the server desires be used. Then, in step 518, the original security information and port are replaced in the received object reference by this new security information and port. This modified object reference may now be used by the foreign client to invoke upon the target object in the server. Accordingly, in step 520 a "location forward" reply is sent to this foreign client along with the newly modified object reference. Finally, in step 522 the client is able to repeat its invocation upon this modified object reference in order to perform the operation desired upon the target object within the server. After this step the procedure ends.

FIG. 8 illustrates a procedure by which a foreign client may perform a locate procedure upon an object reference according to one embodiment of the present invention. A locate function is used when a foreign client deems that it is more efficient to first locate an object using an original object reference and then receive the true object reference before attempting to perform the invocation upon the original object reference. The locate function returns the actual object reference for the target object if it is found. If it is not found, an exception indicating an invalid object is returned to the foreign client.

In a first step 602 this locate request for an original object reference is received by the ORB daemon process of the host computer. The ORB daemon calls a locate handler function in order to process this request as will be described below. Because this object reference is particular to this local ORB, this ORB daemon process will be able to decipher the object key. Thus, in step 604, this handler begins by extracting the server identifier and the security class identifier from the received object reference. Next, the extracted server identifier and the security class identifier are used as arguments in step 606 in order to invoke a look up operation of the ORB daemon locator object. The goal of this look up operation is to eventually return the server port and the server specific security information back to the ORB daemon so that ORB daemon may construct the actual object reference for use in invoking upon the target object within the server. This actual object reference is then returned to the foreign client as explained below. Next, the ORB daemon locator object in conjunction with the ORB daemon locates the appropriate server by reference to a registry of executing servers. In step 608, if it is determined that the identified server is already running then control moves directly to step 614. However, if the server is not already running, then the ORB daemon operates to start up this server process in step 610.

Once the ORB daemon has requested that the server start up, the server starts and then registers itself with the ORB daemon by returning to the ORB daemon its server identifier (in order to indicate which server is being registered), its port for communication, and its security class table. The security class table for a particular server has been described above with reference to FIG. 3. This security class table may contain any number of security mechanisms that a server may wish to use by way of identifying any number of security information fields and corresponding security class identifiers as shown in FIG. 3. This table will be used by the ORB daemon in order to deliver appropriate security information back to the client. The ORB daemon registers this server in step 612 by storing the server identifier, port, security class table and other information in a suitable registry.

At this point, the ORB daemon is ready to construct the actual object reference. First, the ORB daemon utilizes the received security class identifier as an index into the security class table in order to retrieve the appropriate security information that the server desires be used. Then, in step 614, the original security information and port are replaced in the received object reference by this new security information and port. This modified object reference may now be used by the foreign client to invoke upon the target object in the server. Accordingly, in step 616 an "object forward" reply is sent to this foreign client along with the newly modified object reference. Now that the target object has been located, the foreign client may use this modified object reference in order to perform a later invocation upon the target object within the server as in step 618.

Embodiments of the present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to steps for operating a computer in processing electrical or other physical signals to generate other desired signals.

Embodiments of the present invention also relate to an apparatus for performing these operations. This apparatus may be specially constructed for the required purposes, or it may be a general purpose computer selectively activated or reconfigured by a computer program stored in the computer.

The processes presented herein are not inherently related to any particular computer or other apparatus. In particular, various general purpose machines may be used with programs written in accordance with the teachings herein, or it may be more convenient to construct a more specialized apparatus to perform the required method steps. Required structure for a variety of these machines is given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 9:
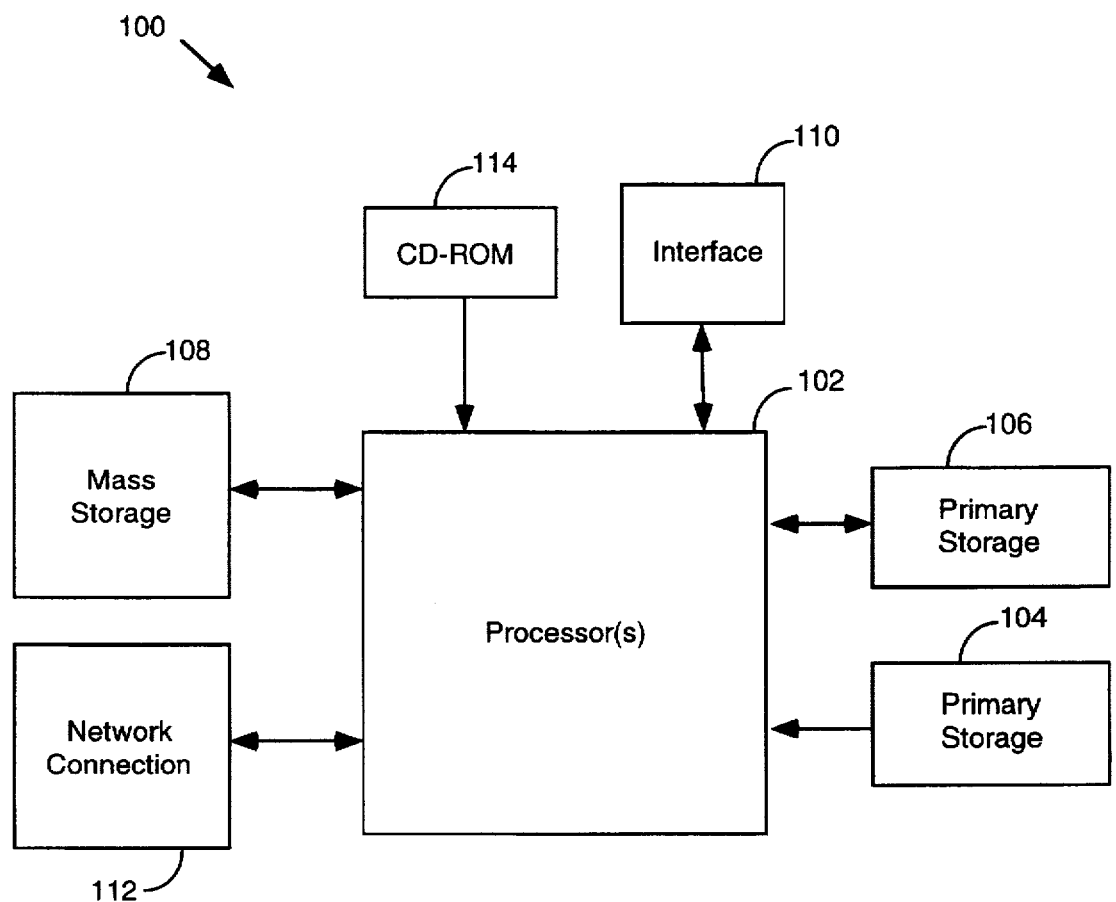
FIG. 9 shows a typical prior art computer system suitable for implementing an embodiment of the present invention.

FIG. 9 illustrates a typical computer system in accordance with an embodiment of the present invention. The computer system 100 includes any number of processors 102 (also referred to as central processing units, or CPUs) that are coupled to storage devices including primary storage 106 (typically a random access memory, or RAM), primary storage 104 (typically a read only memory, or ROM). As is well known in the art, primary storage 104 acts to transfer data and instructions uni-directionally to the CPU and primary storage 106 is used typically to transfer data and instructions in a bi-directional manner. Both of these primary storage devices may include any suitable of the computer-readable media described above. A mass storage device 108 is also coupled bi-directionally to CPU 102 and provides additional data storage capacity and may include any of the computer-readable media described above. The mass storage device 108 may be used to store programs, data and the like and is typically a secondary storage medium such as a hard disk that is slower than primary storage. It will be appreciated that the information retained within the mass storage device 108, may, in appropriate cases, be incorporated in standard fashion as part of primary storage 106 as virtual memory. A specific mass storage device such as a CD-ROM 114 may also pass data uni-directionally to the CPU.

CPU 102 is also coupled to an interface 110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally may be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. For instance, although a particular format for representing security information has been described, a desired security mechanism may be represented and returned to a client in any suitable format. Also, the security class identifier may be any suitable key used to index a list of security mechanisms supported by a server, and need not be necessarily implemented by way of a security class table. In addition, the present invention is applicable to any situation in which secure communications between objects are required where numerous security mechanisms might be supported. Also, the present invention contemplates communications not only within one distributed object system, but also between different object systems having dissimilar protocols. Therefore, the described embodiments should be taken as illustrative and not restrictive, and the invention should not be limited to the details given herein but should be defined by the following claims and their full scope of equivalents.

We claim:

1. In a distributed object computing system including clients and object servers, a host computer including an object request broker (ORB) daemon process arranged to assist in the location of object servers, and an object server arranged to provide a target object, a computer-implemented method of allowing a client to invoke upon a target object in a secure fashion, the method comprising the steps of:

receiving a call from the client by the ORB daemon process, the call to the ORB daemon process using a constructed object reference, the constructed object reference including an object server identifier, original security information and a security class identifier, the call to the ORB daemon process using a first security mechanism corresponding to the original security information contained in the constructed object reference;

determining that the client is authorized to communicate with the ORB daemon process;

retrieving security information specific to the object server that corresponds to the security class identifier contained in the constructed object reference;

returning to the client the retrieved object server security information that corresponds to the security class identifier, such that the client is then able to modify the constructed object reference using the retrieved object server security information to provide a modified object reference and thereby be able to invoke on the target object using the modified object reference.

2. A method as recited in claim 1 wherein the step of returning to the client the retrieved object server security information includes returning to the client a port identifier that corresponds to the object server so that the client may communicate directly with the object server.

3. A method as recited in claim 1 wherein the step of retrieving security information specific to the object server includes comparing the security class identifier with the security information specific to the object server to identify a second security mechanism required to establish communication with the target object.

4. A method as recited in claim 3 wherein a list of security information is associated with the object server and the method further comprises the steps of:

determining whether the object server is running;

starting the object server in response to a determination that the object server is not running; and registering the list of security information associated with the object server with the ORB daemon process.

5. A method as recited in claim 1 wherein the object server is located on the host computer and the client is located on a different computer.

6. In a distributed object computing system including clients and object servers, a host computer including an object request broker (ORB) daemon process arranged to assist in the location of object servers and at least one object server arranged to provide at least one target object, a computer-implemented method of using a client to invoke upon a target object in a secure fashion, the method comprising the steps of:

invoking on an original object reference indicative of the target object, the original object reference including an object server identifier, original security information and a security class identifier;

constructing an ORB object reference for the ORB daemon using the original object reference;

invoking a look up operation on the ORB object reference using the object server identifier and the security class identifier in order to locate the object server, the invocation using a first security mechanism corresponding to the original security information to confirm that the client is authorized to communicate with the object server;

identifying security information specific to the object server that corresponds to the security class identifier in response to confirmation that the client is authorized to communicate with the object server;

receiving from the ORB daemon by the client the identified security information that is specific to the object server and that corresponds to the security class identifier;

replacing the original security information in the original object reference with the server specific security information in order to construct a modified object reference for the target object; and invoking on the modified object reference to communicate with the target object using a second security mechanism corresponding to the returned server specific security information.

7. A method as recited in claim 6 wherein the step receiving from the ORB daemon by the client the identified security information includes returning to the client a port identifier that corresponds to the object server so that the client may communicate directly with the object server.

8. A method as recited in claim 6 wherein the step of identifying security information specific to the object server includes comparing the security class identifier with the security information specific to the object server to identify the second security mechanism.

9. A method as recited in claim 8 wherein a list of security information is associated with the object server and the method further comprises the steps of:

determining whether the object server is running;

starting the object server in response to a determination that the object server is not running; and registering the list of security information associated with the object server with the ORB daemon process.

10. A method as recited in claim 6 wherein the object server is located on the host computer and the client is located on a different computer.

11. In a distributed object computing system including clients and object servers, a host computer including an object request broker daemon process arranged to assist in the location of object servers and at least one object server arranged to provide at least one target object, a computer-implemented method of allowing a foreign client to invoke upon a target object in a secure fashion, the method comprising the steps of:

receiving an invocation from the client on an original object reference indicative of the target object, the original object reference including an object server identifier, original security information and a security class identifier, the invocation using a first security mechanism corresponding to the original security information to confirm that the foreign client is authorized to communicate with the ORB daemon process;

invoking a look up operation within the ORB daemon process using the object server identifier and the security class identifier in order to locate the corresponding object server;

retrieving security information specific to the object server that corresponds to the security class identifier;

replacing within the ORB daemon process the original security information in the original object reference with the server specific security information in order to construct a modified object reference for the target object; and returning to the foreign client the modified object reference such that the foreign client is able to invoke upon the target object directly by using the modified object reference.

12. A method as recited in claim 11 further comprising the steps of:

determining whether the object server identifier of the original object reference matches the object server identifier of the ORB daemon process; and calling a bad server identifier handler in order to perform the locate operation in response to a determination that the object server identifier of the original object reference does not match the object server identifier of the ORB daemon process.

13. A method as recited in claim 11 further comprising the step of extracting the object server identifier and the security class identifier from the original object reference by the ORB daemon process.

14. A method as recited in claim 11 wherein the step of replacing the original security information in the original object reference includes replacing an original port identifier of the original object reference with a server port identifier that corresponds to the object server to enable thereby the client to communicate directly with the object server.

15. A method as recited in claim 11 wherein the step of retrieving security information specific to the object server includes comparing the security class identifier with the security information specific to the object server.

16. A method as recited in claim 15 wherein a list of security information is associated with the object server and the method further comprises the steps of:

determining whether the object server is running;

starting the object server in response to a determination that the object server is not running; and registering the list of security information associated with the object server with the ORB daemon process.

17. A method as recited in claim 11 wherein the object server is located on the host computer and the foreign client is located on a different computer running a second object request broker.

18. An object reference data structure embodied in a computer-readable medium, the object reference data structure being arranged to allow a client to identify a target object on a host computer, the host computer including object servers associated with ports, the object reference data structure comprising:

a host field identifying the host computer, said host field being embodied in said computer-readable medium;

a server identifier that identifies an object server of the host computer that includes the target object, said server identifier being embodied in said computer-readable medium;

a port field identifying a port of the host computer through which the client may communicate with the object server, said port field being embodied in said computer-readable medium;

an object key that uniquely identifies the target object within the object server, said object key being embodied in said computer-readable medium;

a security information field that indicates a particular security mechanism to be used for secure communications between the client and the target object, said security information field being embodied in said computer-readable medium; and a security class identifier that specifies a single security information out of a plurality of security informations to be used for secure communications, said security class identifier being embodied in said computer-readable medium.

19. A computer apparatus for use in allowing a client to communicate with a target object on a host computer within a distributed object system, the host computer including object servers associated with ports, the computer apparatus comprising:

a processing unit;

an input/output device coupled to the central processing unit;

a mass storage device in communication with the central processing unit; and a storage device in communication with the central processing unit, the memory device including an object reference data structure having a host field identifying the host computer, a server identifier that identifies an object server of the host computer that includes the target object; a port field identifying a port of the host computer through which the client may communicate with the object server; an object key that uniquely identifies the target object within the object server; a security information field that indicates a particular security mechanism to be used for secure communications between the client and the target object, and a security class identifier that specifies a single security information out of a plurality of security informations to be used for secure communications.

20. An object request broker computer program embodied in a computer-readable medium for use in brokering a call from a client to a target object on a host computer within a distributed object system, said object request broker computer program being arranged to execute on computer hardware of said distributed object system, the host computer including object servers associated with ports, the object request broker computer program comprising:

a computer process embodied in a computer-readable medium arranged to execute on said host computer and adapted to receive the call from the client in response to the client invoking upon an object reference indicative of the target object, the object reference including a host field identifying the host computer, a server identifier that identifies an object server of the host computer that includes the target object, a port field identifying a port of the host computer through which the client may communicate with the object server, an object key that uniquely identifies the target object within the object server a security information field that indicates the first security information to be used for secure communications between the client and the target object, and a security class identifier that specifies the first security information out of a plurality of security informations to be used for secure communications; and a transport mechanism embodied in a computer-readable medium and adapted to transport the call from the client to the target object in a secure fashion using a first security information included in the object reference, said transport mechanism being further adapted to transport information from the target object to the client in a secure fashion using the first security information included in the object reference.

21. An object request broker computer program as recited in claim 20 wherein said computer process is an object request broker (ORB)_ daemon process located on the host computer, said ORB daemon process being arranged to use a first security mechanism for secure communications between the ORB and the client that is different from a second security mechanism used to establish secure communications between the server and client.

22. An object request broker computer program as recited in claim 21 further comprising a data structure configured to associate the security class identifier with security information contained in the plurality of security informations.

23. A computer program product comprising a computer-usable medium having computer-readable program code embodied thereon for allowing a client to invoke upon a target object in a secure fashion within a distributed object computing system, the distributed object computing system including clients, object servers, and a host computer including an object request broker (ORB) daemon process arranged to assist in the location of object servers and at least one object server arranged to provide at least one target object, the computer program product comprising computer-readable program code for effecting the following steps within the computing system:

receiving a call from the client by the ORB daemon process, the call to the ORB daemon process using a constructed object reference, the constructed object reference including an object server identifier, original security information and a security class identifier, the call to the ORB daemon process using a first security mechanism corresponding to the original security information;

determining that the client is authorized to communicate with the ORB daemon process;

retrieving security information specific to the object server that corresponds to the security class identifier;

returning to the client the retrieved object server security information that corresponds to the security class identifier, such that the client is then able to modify the constructed object reference using the retrieved object server security information to provide a modified object reference and thereby be able to invoke on the target object using the modified object reference.

24. A computer-implemented method of transmitting the computer-readable program code as recited in claim 23, the method comprising the steps of:

storing the program code onto a computer-usable medium;

receiving a request for the transmission of the program code; and transmitting the program code over a network to a remote location on the network.

25. A computer program product comprising a computer-usable medium having computer-readable program code embodied thereon for allowing a foreign client to invoke upon a target object in a secure fashion within a distributed object computing system, the distributed object computing system including clients, object servers, and a host computer including an object request broker (ORB) daemon process arranged to assist in the location of object servers and at least one object server arranged to provide at least one target object, the computer program product comprising computer-readable program code for effecting the following steps within the computing system:

receiving an invocation from the client on an original object reference indicative of the target object, the original object reference including an object server identifier, original security information and a security class identifier, the invocation using a first security mechanism corresponding to the original security information to confirm that the foreign client is authorized to communicate with the ORB daemon process;

invoking a look up operation within the ORB daemon process using the object server identifier and the security class identifier in order to locate the corresponding object server;

retrieving security information specific to the object server that corresponds to the security class identifier;

replacing within the ORB daemon process the original security information in the original object reference with the server specific security information in order to construct a modified object reference for the target object; and returning to the foreign client the modified object reference such that the foreign client is able to invoke upon the target object directly by using the modified object reference.

26. A computer program product comprising a computer-usable medium having computer-readable program code embodied thereon for using a client to invoke upon a target object in a secure fashion within a distributed object computing system, the distributed object computing system including clients, object servers, and a host computer including an object request broker (ORB) daemon process arranged to assist in the location of object servers and at least one object server arranged to provide at least one target object, the computer program product comprising computer-readable program code for effecting the following steps within the computing system:

invoking on an original object reference indicative of the target object, the original object reference including an object server identifier, original security information and a security class identifier;

constructing an ORB object reference for the ORB daemon using the original object reference;

invoking a look up operation on the ORB object reference using the object server identifier and the security class identifier in order to locate the object server, the invocation using a first security mechanism corresponding to the original security information to confirm that the client is authorized to communicate with the object server;

identifying security information specific to the object server that corresponds to the security class identifier in response to confirmation that the client is authorized to communicate with the object server;

receiving from the ORB daemon by the client the identified security information that is specific to the object server and that corresponds to the security class identifier;

replacing the original security information in the original object reference with the server specific security information in order to construct a modified object reference for the target object; and invoking on the modified object reference to communicate with the target object using a second security mechanism corresponding to the returned server specific security information.

* * * * *